May 1, 1928.

A. T. GRUENBERG 1,668,312

ELECTRIC COMBINATION URN

Filed Jan. 9, 1923

Inventor
Alexander T. Gruenberg,
By his Attorney
Henry J. Lucke.

May 1, 1928.
A. T. GRUENBERG
1,668,312
ELECTRIC COMBINATION URN
Filed Jan. 9, 1923
2 Sheets-Sheet 2
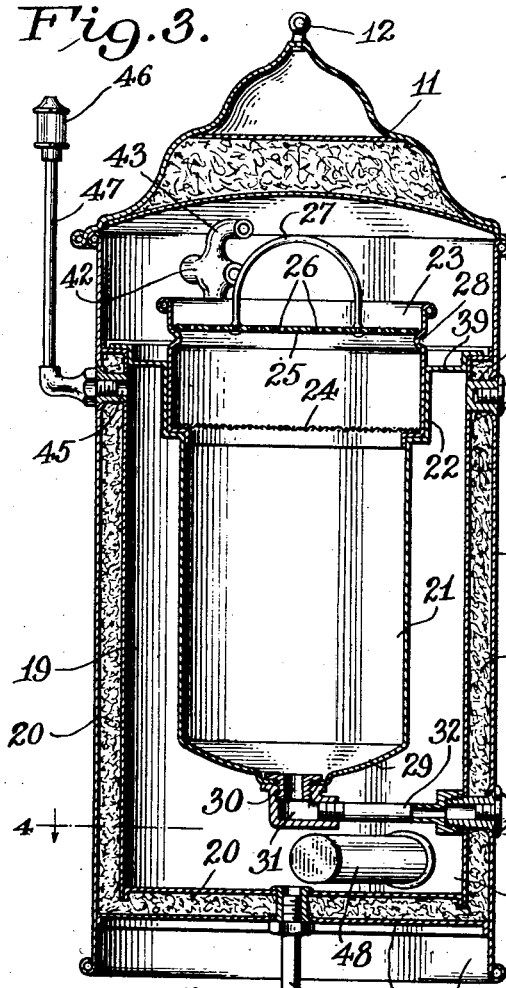
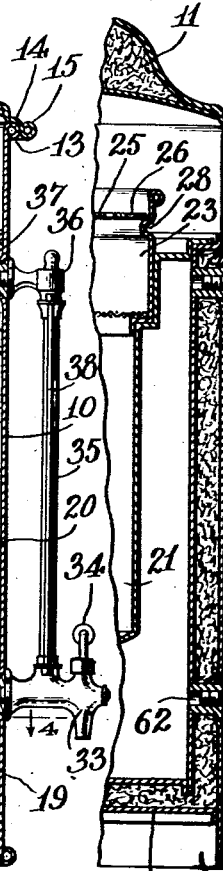
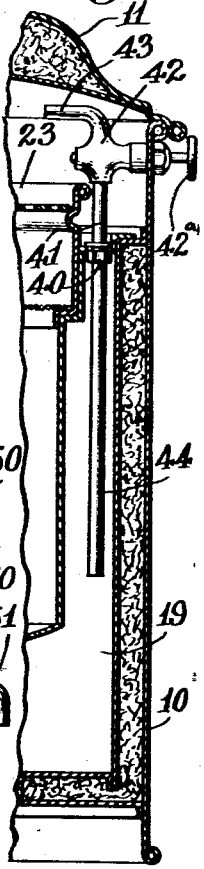
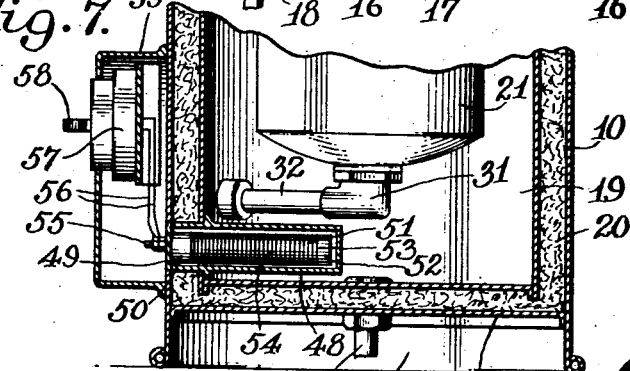
Inventor,
Alexander T. Gruenberg
By his Attorney,
Henry J. Lucke.

Patented May 1, 1928.

1,668,312

UNITED STATES PATENT OFFICE.

ALEXANDER T. GRUENBERG, OF KINGSTON, NEW YORK, ASSIGNOR TO L. BARTH & SON, INC., A CORPORATION OF NEW YORK.

ELECTRIC COMBINATION URN.

Application filed January 9, 1923. Serial No. 611,682.

This invention relates to urns for coffee and like decoctions.

An object of this invention is to provide for a single urn or like receptacle embodying combinedly in a single unit space for the water to be heated and a space for holding the formed coffee or like decoction, and such additional space as may be required for the ground coffee or like material from which the decoction is made.

A further feature of the invention is the provision of a heating element, preferably of an electrical type, positioned within a permanently closed casing having an opening located at the side of the urn proper to provide for removal of the heating unit for purposes of inspection or repair.

A further feature embodies the mounting of the switch or like control element of the heating element and for concealing and protecting the electrical connection, as is desirable to avoid short circuiting or effective impairment of the electrical connections when drawing off the coffee and when filling the urn with water.

Pursuant to a preferred form of the invention, the urn comprises a casing suitably insulated with heat insulating material and having a removable cover, an inwardly disposed casing for receiving and storing the formed decoction, a container having a foraminous bottom removably located within such inwardly disposed casing and for holding the ground coffee, the interior of the urn proper being liquid and vapor proof for the region above the casing for storing the formed coffee, and a passage provided with a valve having its manipulating member extending exteriorly of the urn and affording flow of the heated water from a lower portion of the interior of the urn to a region above the container holding the ground coffee. The heating unit is in the form of a tube of insulation provided with a special groove within which is wound the electrical heating wire, which heating coil is disposed within a housing closed within the interior of the urn and open at the side of the urn, the coil being supported by the cover of such housing. A hollow face plate is provided for holding and enclosing the switch elements and extending over the opening of the coil housing to conceal the same and also protect the wiring extending from the switch to the coil terminals.

Further features and objects of the invention will be more fully understood from the following detail description and the accompanying drawings, in which Fig. 1 is a perspective elevation of the combination urn embodying my invention;

Fig. 3 is a vertical section on line 3—3 of Fig. 2;

Fig. 5 is a vertical section on line 5—5 of Fig. 2;

Fig. 6 is a detail vertical section on line 6—6 of Fig. 2; and

Fig. 7 is a detail vertical section on line 7—7 of Fig. 2.

Figure 1:
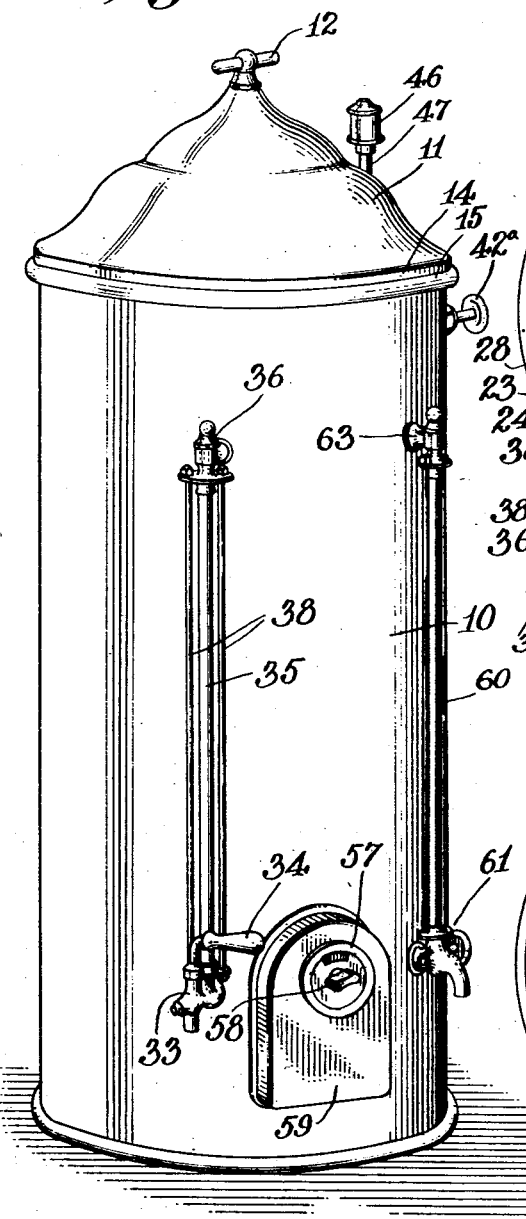
Figure 2:
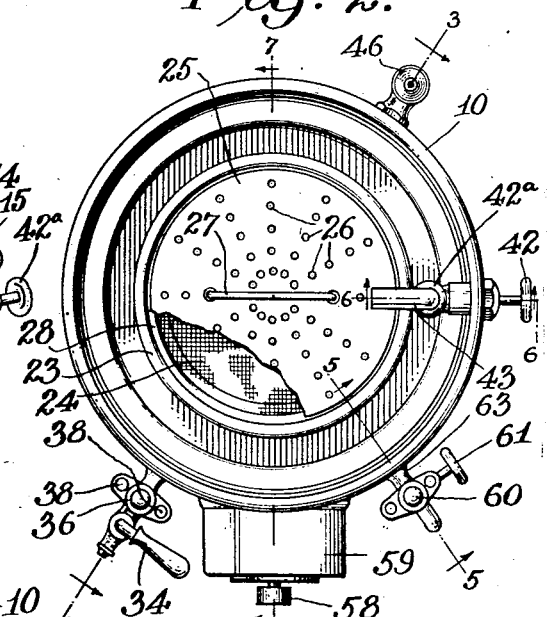
Fig. 2 is a top plan view of the urn shown in Fig. 1, with the cover removed.

Referring to the drawings, the urn proper is indicated at 10 and may be of cylindrical configuration or other ornamental design as desired. The cover 11 is of a dome shape and is provided with the handle 12 to facilitate removal and replacement of the cover 11 when desired. The cover 11 may be sealed under action of gravity with the open top of the urn 10 by means of the bead 13 formed at the upper edge of the urn 10 and seated within the correspondingly curved concavity 14 formed in the peripheral portion of the cover 11 and stiffened by the bead 15 formed at the edge of the cover 11.

The bottom 16 of the urn 10 is preferably located above the lower edge 17 of the urn, and the inflow nipple 18, for connection with any suitable supply of water, may be positioned in the bottom 16. The bottom and major portion of the side of the urn 10 is preferably insulated against dissipation of heat by forming the interior wall 19 and providing space for the asbestos fibres 20, or the like.

Within the interior of the urn 10, is located the casing 21 having the angular enlarged upper portion 22 for receiving and holding therein the container 23 having the foraminous bottom 24 of wire mesh or the like. The container 23 may be provided with the cover 25 having the perforations 26 permitting inflow of heated water therethrough, as will more fully appear hereinafter. The cover plate 25 is provided with the handle 27. The cover plate 25 may be located within the container 23 by forming the inwardly turned bead 28.

The bottom of the casing 21 is preferably conical as indicated at 29, and provided with the outflow opening 30, communicating with the outlet 31 connected by the nipple 32 to the faucet 33, having the handle 34.

To the faucet 33 is connected the level indicating tube 35 of glass or the like, held at its upper end within the bracket 36, secured within the threaded block 37 located within a suitable opening in the side of the casing 10 vertically above the faucet 33. The level indicating tube is provided with the brace rods 38.

At a suitable upper portion of the interior of the urn 10, I provide the liquid and vapor proof partition 39 which may be formed integrally with the upper portion 22 of the interior casing 21. Through a suitable opening 40 in the partition 39 extends the pipe 41 connected at its upper end to the cock 42, the discharge opening 43 of which extends above the cover plate 25 of the container 23. The lower end 44 of the pipe 41 is located a considerable distance below the minimum level of the water in the urn 10.

Suitably connected with the interior of the urn 10 and above the maximum level of the water therein and below the sealing partition 39, is the opening 45 to which is connected the release valve 46, by means of a nipple 47.

Projecting interiorly of the urn at a lower portion thereof, I provide the housing 48 closed permanently on all its sides within the interior of the urn 10 and open solely at the side 49 on the exterior of the urn 10. The cover plate 50 is provided for closing the exterior opening of the housing 48. To the cover plate 50 is secured the electrical heating coil 51, preferably formed of the tube 52 of insulation and provided with a spiral groove 53 in which is wound the wiring 54, the terminals of which are secured to the terminal posts 55, 55.

The electrical leads 56, 56 connect with the contacts (not shown) of the switch 57 having the movable switch finger 58. The switch is connected to the house lighting circuit or other suitable source of electrical energy.

Preferably, the hollow face plate 59 serves to enclose the switch 57, leads 56 and the terminals 55, and also the cap 50 of the housing 48, thereby concealing these parts and protecting the same from exposure of steam or other vapor, water and the like.

The glass tube 60 is provided for indicating the level of the water within the interior of the urn 10 as by connecting with the faucet 61 and the nipple 62 with the interior of the urn; the upper end of the indicating tube 60 may be connected through the hollow bracket 63 and nipple 64 with the upper portion of the interior of the urn. The height of the water in the urn is indicated by the level in the indicator tube 60.

It will be noted that the housing 48 by reason of its sealed sides within the interior of the urn 10 is at all times closed against entry of liquid. The mounting of the electrical heating coil 51 as a unit on the cover plate 50 of the housing 48 permits the heating coil to be removed for repair or inspection by simple removal of the cover plate 50. Such construction affords also removal of the heating coil without disturbing the water or other liquid within the urn and without disconnecting the urn from the water piping or other supply.

In the use of the urn, water is let into the interior of the urn through the nipple 18 connected through a suitable cock with the house water piping or with any other suitable source. Upon removing the cover 11 and the top plate 25, the coffee in granulated, or powdered or other form, is placed in the container 23. The top plate 25 and cover 11 are then replaced, whereafter the urn is now prepared for the making of coffee or like decoction. The electrical coil is energized upon closing the switch 57 and upon bringing the water within the interior of the urn to boiling temperature, with the cock 42 closed, the generated steam is collected under pressure by reason of the sealing partition 39. Upon opening the valve-wheel 42$^a$ of the cock 42, the heated water passes upwardly through the pipe 44, nipple 41 and out of the discharge opening 43 of the cock 42 and is distributed by the top plate 25 over the coffee or the like contained within the container 23. The formed coffee passes through the foraminous bottom 24 of the container 23 and is stored within the container 21 for use to be drawn off through the cock 33, as desired. The amount of coffee stored within the storage casing 21 is indicated by the level shown in the indicator tube 35.

Figure 4:
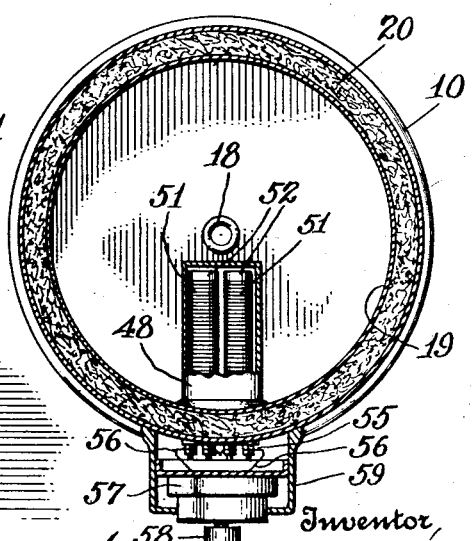
Fig. 4 is a vertical section on line 4—4 of Fig. 3.

If desired, two electrical heating coils 51, 51 may be employed as is indicated in Fig. 4 and the respective terminals connected electrically in multiple as is indicated in Fig. 4, or may be connected in parallel as may be desired.

From the above, it will be observed that my invention provides for a single urn for forming and storing a supply of heated water and for forming and storing a heated supply of coffee or like decoction and that the heating of the water and of the stored coffee or like decoction is effected by means of a single heating means.

It will be further observed that the invention affords the use of a heating unit which may be removed for purposes of inspection or repair without causing the emptying of the urn or without causing disconnection of the urn from the water supply.

The invention is further advantageous in affording protection of the delicate parts including the electrical parts from contact with water or other moisture and also reduces the number of connections disposed outwardly of the urn as is necessary in heretofore proposed coffee urns which required separate urns for the heated water and the formed coffee or like decoction.

Whereas I have described my invention by reference to specific forms thereof it will be understood that many changes and modifications may be made without departing from the spirit of the invention.

I claim:

1. In combination, a heating urn and electric heating mechanism therefor, the urn having an inner and outer wall, and a watertight metal housing extending into the interior of the urn and through apertures in the urn walls and in watertight engagement with the inner wall, a removable closure plate for the outer end of said housing, and an electric resistance unit detachably secured to the inner face of the closure plate and having circuit terminals exterior thereto.

2. In combination, a heating urn and electric heating mechanism therefor, the urn having an inner and outer wall and a watertight metal housing extending into the interior of the urn and through apertures in the urn walls and in watertight engagement with the inner wall, a removable closure plate for the outer end of said housing, and an electric resistance unit detachably secured to the inner face of the closure plate and having circuit terminals exterior thereto, a controlling switch mounted externally on the urn and having leads connectable to the terminals of the heating unit, and a removable housing for the switch, leads and terminals.

In testimony whereof I have signed this specification this 31st day of March 1922.

ALEXANDER T. GRUENBERG.